United States Patent
Moens et al.

(10) Patent No.: US 11,888,683 B2
(45) Date of Patent: Jan. 30, 2024

(54) METHOD AND CONTROL SYSTEM FOR CONTROLLING PROVISIONING OF A SERVICE IN A NETWORK

(71) Applicants: Koninklijke KPN N.V., The Hague (NL); IMEC VZW, Leuven (BE); Universiteit Gent, Ghent (BE)

(72) Inventors: Hendrik Moens, Kalken (BE); Jeroen Famaey, Zwijndrecht (BE)

(73) Assignees: Koninklijke KPN N.V., Rotterdam (NL); Imec VZW, Leuven (BE); Universiteit Gent, Ghent (BE)

(*) Notice: Subject to any disclaimer, the term of this patent is extended or adjusted under 35 U.S.C. 154(b) by 0 days.

(21) Appl. No.: 15/556,166

(22) PCT Filed: Mar. 11, 2016

(86) PCT No.: PCT/EP2016/055216
§ 371 (c)(1),
(2) Date: Sep. 6, 2017

(87) PCT Pub. No.: WO2016/146494
PCT Pub. Date: Sep. 22, 2016

(65) Prior Publication Data
US 2018/0041388 A1    Feb. 8, 2018

(30) Foreign Application Priority Data
Mar. 13, 2015    (EP) ..................... 15159021

(51) Int. Cl.
*H04L 12/24* (2006.01)
*H04L 15/16* (2006.01)
(Continued)

(52) U.S. Cl.
CPC ...... *H04L 41/0806* (2013.01); *G06F 9/45558* (2013.01); *H04L 41/0853* (2013.01);
(Continued)

(58) Field of Classification Search
CPC ................. G06F 9/45558; G06F 8/63; G06F 2009/45595; G06F 2009/45562;
(Continued)

(56) References Cited

U.S. PATENT DOCUMENTS 6,498,795 B1 * 12/2002 Zhang .................. G06F 16/951
709/219
8,918,631 B1 * 12/2014 Kumar .................... H04L 63/00
370/254
(Continued)

FOREIGN PATENT DOCUMENTS

CA    3004097 A1 * 11/2018    ............. G06F 16/00
CA    3088504 A1 *  6/2020    ........... H04N 19/105
(Continued)

OTHER PUBLICATIONS

European Search Report, European Patent Application No. 15159021. 3, dated Feb. 23, 2016, 6 pages.
PCT International Search Report and Written Opinion, PCT International Application No. PCT/EP2016/055216, dated Jun. 22, 2016, 14 pages.
(Continued)

*Primary Examiner* — David R Lazaro
*Assistant Examiner* — Berhanu Shitayewoldetadik
(74) *Attorney, Agent, or Firm* — McDonnell Boehnen Hulbert & Berghoff LLP

(57) ABSTRACT

The disclosure relates to a computer-implemented method and control system for controlling provisioning of a service in a network. A network function specification data structure of a network function of the service is obtained, wherein the network function specification data structure is associated with at least a first network function implementation, e.g. a physical network function implementation, and a second network function implementation, e.g. a virtual network function implementation, for performing the network function of the service. Network service provisioning is controlled comprising selecting the first network function
(Continued)

implementation or the second network function implementation of the network function in the network function specification data structure.

17 Claims, 5 Drawing Sheets

(51) Int. Cl.
| | |
|---|---|
| H04L 29/08 | (2006.01) |
| H04L 29/06 | (2006.01) |
| H04L 12/26 | (2006.01) |
| G06F 15/16 | (2006.01) |
| G06F 9/455 | (2018.01) |
| G06F 8/30 | (2018.01) |
| H04L 41/0806 | (2022.01) |
| H04L 41/0893 | (2022.01) |
| H04L 41/5009 | (2022.01) |
| H04L 67/10 | (2022.01) |
| H04L 41/5041 | (2022.01) |
| H04L 67/51 | (2022.01) |
| H04L 41/0853 | (2022.01) |
| G06F 8/61 | (2018.01) |

(52) U.S. Cl.
CPC ...... *H04L 41/0893* (2013.01); *H04L 41/5009* (2013.01); *H04L 41/5045* (2013.01); *H04L 67/10* (2013.01); *H04L 67/51* (2022.05); *G06F 8/63* (2013.01); *G06F 2009/45562* (2013.01); *G06F 2009/45595* (2013.01)

(58) Field of Classification Search
CPC . H04L 41/0806; H04L 67/10; H04L 41/5045; H04L 41/0853; H04L 67/16; H04L 41/5009; H04L 41/0893; H04L 41/5041; H04L 41/5048; H04L 41/5051; H04L 41/5054
USPC ......................................................... 709/220
See application file for complete search history.

(56) References Cited

U.S. PATENT DOCUMENTS

| | | | | |
|---|---|---|---|---|
| 8,977,725 | B2* | 3/2015 | Lu | G06F 9/45558 718/1 |
| 9,276,816 | B1* | 3/2016 | Conte | H04L 41/0895 |
| 9,430,262 | B1* | 8/2016 | Felstaine | G06F 9/45558 |
| 9,660,929 | B1* | 5/2017 | Herzog | H04L 41/5051 |
| 9,853,869 | B1* | 12/2017 | Shaham | H04L 41/5054 |
| 9,853,914 | B1* | 12/2017 | Felstaine | H04L 43/0876 |
| 9,887,960 | B2* | 2/2018 | Chanda | H04L 45/586 |
| 10,303,879 | B1* | 5/2019 | Potlapally | G06F 21/57 |
| 2002/0044567 | A1* | 4/2002 | Voit | H04L 47/2408 370/467 |
| 2003/0135850 | A1* | 7/2003 | Miloushev | G06F 8/70 717/165 |
| 2004/0060073 | A1* | 3/2004 | Bialk | H04L 41/0806 725/132 |
| 2004/0208292 | A1* | 10/2004 | Winterbottom | H04L 41/5054 379/1.01 |
| 2006/0045004 | A1* | 3/2006 | Charzinski | H04L 45/02 370/242 |
| 2006/0050862 | A1* | 3/2006 | Shen | H04L 61/5014 370/352 |
| 2006/0111085 | A1* | 5/2006 | Lee | H04M 3/02 455/412.2 |
| 2007/0110043 | A1* | 5/2007 | Girard | H04M 7/0069 370/352 |
| 2007/0274327 | A1* | 11/2007 | Kaarela | H04L 12/2836 370/401 |
| 2008/0304644 | A1* | 12/2008 | Mishra | H04L 65/1096 379/201.12 |
| 2009/0248846 | A1* | 10/2009 | Cohn | H04L 45/76 709/223 |
| 2011/0090817 | A1* | 4/2011 | Qu | H04L 5/001 370/254 |
| 2011/0134248 | A1* | 6/2011 | Heit | H04N 1/00286 348/161 |
| 2011/0238860 | A1* | 9/2011 | Vange | H04L 47/24 709/233 |
| 2011/0300809 | A1* | 12/2011 | Gordiyenko | H04B 17/23 455/67.12 |
| 2012/0009903 | A1* | 1/2012 | Schultz | H04M 1/72427 455/412.2 |
| 2012/0036236 | A1* | 2/2012 | Richardson | H04L 12/66 709/220 |
| 2012/0110356 | A1* | 5/2012 | Yousefi | H04N 19/102 713/320 |
| 2012/0173900 | A1* | 7/2012 | Diab | H04L 12/10 713/310 |
| 2012/0173905 | A1* | 7/2012 | Diab | H04L 12/66 713/320 |
| 2012/0221955 | A1* | 8/2012 | Raleigh | H04M 15/00 726/1 |
| 2012/0297379 | A1* | 11/2012 | Anderson | G06F 9/45558 718/1 |
| 2012/0317224 | A1* | 12/2012 | Caldwell | H04W 72/542 709/217 |
| 2013/0204971 | A1* | 8/2013 | Brandwine | H04L 12/4641 709/217 |
| 2013/0212285 | A1* | 8/2013 | Hoffmann | H04L 12/4641 709/226 |
| 2014/0006574 | A1* | 1/2014 | Fischer | H04L 41/082 709/221 |
| 2014/0032691 | A1* | 1/2014 | Barton | H04W 12/08 709/206 |
| 2014/0095760 | A1* | 4/2014 | Toillon | G06F 13/4022 710/310 |
| 2014/0129719 | A1* | 5/2014 | Weber | H04L 47/70 709/226 |
| 2014/0140213 | A1* | 5/2014 | Raleigh | H04L 43/062 370/235 |
| 2014/0146673 | A1* | 5/2014 | Parker | H04L 47/10 370/252 |
| 2014/0207546 | A1* | 7/2014 | Nanez | G06Q 30/0277 705/14.15 |
| 2014/0244808 | A1* | 8/2014 | Axelrod | H04L 41/042 709/220 |
| 2014/0317293 | A1* | 10/2014 | Shatzkamer | H04L 41/5054 709/226 |
| 2014/0362857 | A1 | 12/2014 | Guichard et al. | |
| 2015/0040127 | A1* | 2/2015 | Dippenaar | G06F 9/4856 718/1 |
| 2015/0143456 | A1* | 5/2015 | Raleigh | H04L 63/20 726/1 |
| 2015/0169746 | A1* | 6/2015 | Hatami-Hanza | G06N 5/022 706/18 |
| 2015/0249573 | A1* | 9/2015 | Miller | H04L 41/0816 709/221 |
| 2015/0295761 | A1* | 10/2015 | Wang | H04L 41/0233 709/222 |
| 2016/0006610 | A1* | 1/2016 | Brandwine | H04L 41/0806 709/218 |
| 2016/0062746 | A1* | 3/2016 | Chiosi | H04L 41/0843 717/104 |
| 2016/0087840 | A1* | 3/2016 | Miller | H04L 41/0813 709/221 |
| 2016/0103698 | A1* | 4/2016 | Yang | G06F 9/45558 718/1 |
| 2016/0119219 | A1* | 4/2016 | Fang | H04L 41/122 370/392 |
| 2016/0127478 | A1* | 5/2016 | Chastain | H04L 41/40 709/223 |
| 2016/0203027 | A1* | 7/2016 | Challa | G06F 9/45558 718/1 |

(56) References Cited

U.S. PATENT DOCUMENTS

| | | | |
|---|---|---|---|
| 2016/0205015 A1* | 7/2016 | Halligan | H04L 12/6418 370/400 |
| 2016/0212020 A1* | 7/2016 | Gupte | H04L 41/0883 |
| 2016/0226913 A1* | 8/2016 | Sood | G06F 21/577 |
| 2016/0246635 A1* | 8/2016 | Kaplan | G06F 9/5077 |
| 2016/0335111 A1* | 11/2016 | Bruun | H04L 41/50 |
| 2016/0373359 A1* | 12/2016 | Bruun | H04L 41/40 |
| 2017/0169356 A1* | 6/2017 | Dousse | G06Q 10/10 |
| 2017/0171015 A1* | 6/2017 | Lin | H04L 47/78 |
| 2017/0185494 A1* | 6/2017 | Yang | G06F 9/45558 |
| 2017/0324612 A1* | 11/2017 | Perez | H04L 41/0806 |
| 2018/0165167 A1* | 6/2018 | Yang | G06F 11/202 |
| 2019/0034363 A1* | 1/2019 | Palermo | G06F 13/4022 |
| 2020/0174898 A1* | 6/2020 | Yang | G06F 11/2041 |

FOREIGN PATENT DOCUMENTS

| | | | | | |
|---|---|---|---|---|---|
| CN | 104011685 | A | * | 8/2014 | G06F 9/455 |
| CN | 103944768 | B | * | 5/2018 | G06F 9/45558 |
| CN | 108353281 | B | * | 1/2021 | H04W 12/06 |
| GB | 2525701 | A | * | 11/2015 | H04L 12/46 |
| JP | 6811304 | B2 | * | 1/2021 | H04L 67/10 |
| WO | WO-2007035813 | A1 | * | 3/2007 | H04L 1/0002 |
| WO | WO-2014128948 | A1 | * | 8/2014 | G06F 9/45558 |
| WO | 2015/031866 | A1 | | 3/2015 | |
| WO | WO-2015031866 | A1 | * | 3/2015 | G06F 17/30 |
| WO | WO-2016029726 | A1 | * | 3/2016 | H04L 12/4641 |
| WO | WO-2016050270 | A1 | * | 4/2016 | G06F 9/44505 |

OTHER PUBLICATIONS

"Network Function Virtualization (NFV) Management and Orchestration", ETSI, GS NFV-MAN 001 V0.6.1, Jul. 2014, pp. 1-196.

M. Chiosi, D. Clarke, P. Willis, A. Reid, J. Feger, M. Bugenhagen, W. Khan, M. Fargano, et al. "Network Functions Virtualisation (NFV)—An Introduction, Benefits, Enablers, Challenges & Call for Action" Oct. 22-24, 2012 at the "SDN and OpenFlow World Congress", Darmstadt-Germany; available online: http://portal.etsi.org/nfv/nfv_white_paper.pdf.

M. Chiosi, D. Clarke, P. Willis, C. Donley, L. Johnson, M. Bugenhagen, J. Feger, W. Khan, C. Cui, H. Deng, C. Chen, et al. "Network Functions Virtualisation (NFV)—Network Operator Perspectives on Industry Progress." Oct. 15-17, 2013 at the "SDN and OpenFlow World Congress", Frankfurt-Germany; available online: http://portal.etsi.org/nfv/nfv_white_paper2.pdf.

P. Quinn, T. Nadeau, "Service Function Chaining Problem Statement." IETF Internet Draft, Aug. 11, 2014; Available online: http://www.ietf.org/id/draft-ietf-sfc-problem-statement-10.txt.

"Agility by easily tapping new capacity: bursting with HP cloudsystem", Whitepaper, available: http://www.twhitepapers.co.uk/content38647, 2014.

"Open Virtualization Format (OVF)", DMTF, 2013; http://www.dmtf.org/standards/ovf.

OpenFlow, Open Networking Foundation, OpenFlow Switch Specification, Version 1.3.2 (Wire Protocol 0x04), Apr. 25, 2013; https://www.opennetworking.org/sdn-resources/onf-specifications/openflow.

Network Function Virtualization (NFV) Management and Orchestration (draft), ETSI, GS NFV-MAN 001 V0.6.1 (Jul. 2014), http://docbox.etsi.org/ISG/NFV/Open/Latest_Drafts/NFV-MAN001v061-%20management%20and%20orchestration.pdf.

H. Moens, F. De Turck, "VNF-P: A model for efficient placement of virtualized network func-tions," First International Workshop on Management of SDN and NFV Systems, 2014.

\* cited by examiner

```
<NetworkFunctionSpecification>
    <Resource name="requestsPerSecond" type="double"/>
    <Interface ref="path/to/service/specification"/>
    <FunctionImplementation type="VM">
        <Image ref="path/to/image.ova">
        <InterfaceImpl ref="path/to/service/impl1"/>
    </FunctionImplementation>
    <FunctionImplementation type="hardware">
        <Hardware ref="typeName"/>
        <InterfaceImpl ref="path/to/service/impl2"/>
    </FunctionImplementation>
</NetworkFunctionSpecification>
```

FIG. 3B

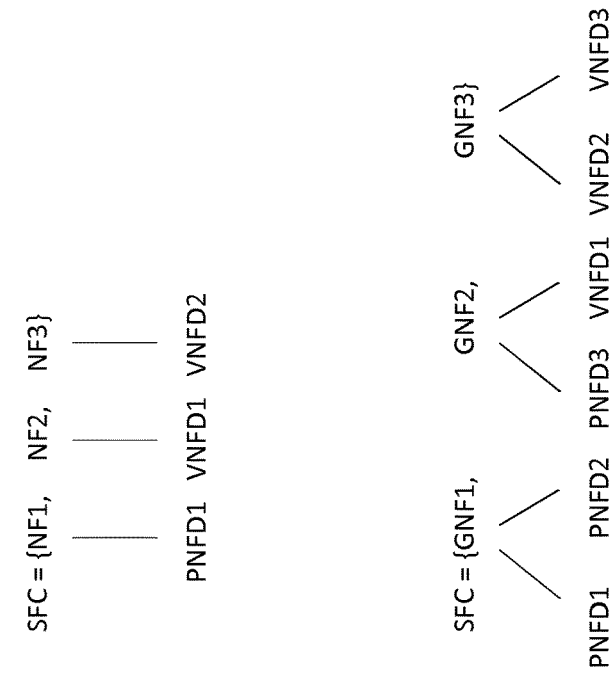

FIG. 3A

METHOD AND CONTROL SYSTEM FOR CONTROLLING PROVISIONING OF A SERVICE IN A NETWORK

CROSS REFERENCE TO RELATED APPLICATIONS

The present application is a national stage entry of, and claims priority to, PCT/EP2016/055216, filed on Mar. 11, 2016, which claims priority to European Patent Application EP 15159021.3, filed in the European Patent Office on Mar. 13, 2015, both of which are hereby incorporated in their entirety herein by reference.

FIELD OF THE INVENTION

The invention relates to a method and control system for controlling provisioning of a service in a network. More specifically, the invention relates to a computer implemented method and control system for controlling provisioning in a network comprising physical network functions and virtual network functions. The invention also relates to a network function specification data structure.

BACKGROUND

In traditional networks, the functionality of a network node is coupled with a physical device and, hence, the establishment of a network service involves setting up physical devices, their connections and configuration. If long-term demand changes for an existing service or a new service is demanded, the network operator may be required to add or remove devices from the network to increase or decrease capacity or functionality if the existing devices cannot meet the change.

A particular service may comprise one or more functions to be executed in the network. These functions are referred to as network functions. A network function is responsible for a specific treatment of packets received by the function.

The network function can be embedded in a physical network element, e.g. function specific hardware or firmware (i.e. a physical network function PNF) or be a software instance (i.e. a virtual network function VNF), running on a multi-purpose machine, i.e. a machine not dedicated to a specific purpose.

Network Functions Virtualization (NFV) is a method to decouple network functions, e.g. router, firewall, application layer gateway or a virus scanner, from the physical device using virtualization technologies, such as VMware. Virtualization enables physical devices to be regarded as resources on which network functions can be loaded dynamically. For example, when a network service is required to filter traffic at a certain location in a network, NFV allows for the allocation of a firewall network function to a multi-purpose device (e.g. a device hosted in a cloud datacenter).

A service can be described as a Service Function Chain (SFC). An SFC defines a set of one or more network functions of a service and ordering constraints for the functions through which data packets are exposed.

ETSI Draft Specification GS-NFV-MAN V0.6.1, "Network Function Virtualization (NFV): Management and Orchestration" (2014-July) describes the management and orchestration framework required for provisioning virtualized network functions and related operations. One scenario that is described in the ETSI Draft Specification is that virtual network functions can be chained to other virtual network functions and/or physical network functions to realize a network service.

SUMMARY

The inventors have recognized a need for more flexibility in controlling service provisioning in a network using one or more network functions.

Hence, one aspect of the present disclosure involves a computer-implemented method in a control system for controlling provisioning of a service in a network. The network service involves at least one network function to be performed. A network function specification data structure is obtained in order to control the service provisioning. The network function specification data structure is associated with at least a first network function implementation and a second network function implementation for performing the network function of the service. The control of the service provisioning involves selecting the first network function implementation or the second network function implementation of the network function in the network function specification data structure.

The disclosure also relates to a computer program or suite of computer programs for performing the disclosed method and to a non-transitory record carrier carrying the network function specification data structure.

Another aspect of the present disclosure involves a network function control system configured for controlling provisioning of a service in a network, wherein the control system is configured for:

obtaining a network function specification data structure of a network function of the service, wherein the network function specification data structure is associated with at least a first network function implementation and a second network function implementation for performing the network function of the service; and controlling provisioning of the service in the network comprising selecting the first network function implementation or the second network function implementation of the network function in the network function specification data structure.

The network function control system may be configured to perform one or more steps of the method for controlling service provisioning in a network.

Yet another aspect of the present disclosure pertains to a network function specification data structure specifying a network function in a network, wherein the network function specification data structure is associated with at least a first network function implementation and a second network function implementation for performing the network function of the service in the network.

One manner of associating the network function specification data structure with the first network function implementation and the second network function implementation is by having a first reference in the data structure to the first network function implementation and a second reference in the data structure to the second network function implementation.

The network function specification data structure is a generic data structure defining an individual network function of a service containing at least a first network function implementation and a second network function implementation. By defining options for the implementation of the network function from which a selection can be made, flexibility in controlling network service provisioning is obtained. One example of controlling service provisioning is controlling the allocation of resources to the network service.

It should be appreciated that the implementations of the network functions may differ from each other in one or more characteristics. One characteristic pertains to different configurations for performing the network function. Another difference relates to the performance of the implementations. Still another characteristic, that will be described below in more detail, relates to the distinction between physical network functions and virtual network functions.

The network function specification data structure may have an hierarchical structure. In one embodiment, one or more generic properties of the network function may be defined in a root, while a first branch is defined for the at least one first network function implementation and a second branch is defined for the at least one second network function implementation. Properties relating specifically to the first network function implementation and the second network function implementation may be defined in the respective branches. If the first and second network function implementations relate to two physical network function or to two virtual network functions having distinct properties, the control system may determine the appropriate network function implementation based on the different properties and the requirements from the service request (as e.g. contained in the service function chain).

In one embodiment, the network function specification data structure further comprises at least one property applying to both the first network function implementation and the second network implementation. Examples of generic properties include resource definitions and configuration interfaces.

It should be appreciated that more than two network function implementations may be associated with the network function specification data structure. In that case, one of these network function implementations may be selected. Multiple network function implementations may be defined in a single branch of the data structure.

The particular implementation of the network function can be selected on the basis of a particular condition set for the selection. The particular condition may involve the status of certain information. The information may e.g. relate to:
network state information, such as the load on one or more physical machines;
policy information
service level requirement information;
quality of service requirement information; and
configuration requirement information for the network function;

In one example, a base service load for one or more network functions is handled by one or more physical implementations of a network function, whereas loads above a particular threshold load are handled by one or more virtual implementations of that network function. In this manner it is possible to efficiently handle the base load and fully utilize the available efficient physical network functions while still being able to cope with changes in resource requirements using dynamically allocated virtual network function implementations. An additional advantage is that, as a result of full the use of the physical network functions that usually have a better performance, the total required amount of resources in such an arrangement is less than in a situation wherein only virtual network functions would be used.

In another example, a request for a service may contain service level and/or configuration requirements for a service and/or network function that cannot be met by a virtual implementation of that network function. The network function specification data structure enables using or switching to a physical network function able to meet the requirements.

Network services may require multiple functions to be performed in a specific order. Such a network service may be defined as a service function chain. In one embodiment, the service function chain comprises a reference to the network function specification data structure. When the service function chain contains multiple network functions, each network function may be referred to by a reference to a network function specification data structure comprising at least one first network function implementation and at least one second network implementation of that network function.

In one embodiment, the controlling of the provisioning of the service includes one or more of:
providing routing information for data packets to be processed by the network function, wherein the routing information is dependent on the selection of the first network function implementation or the second network function implementation;
configuring or instantiating at least one of the first network function implementation and the second network function implementation when the first network function implementation or the second network function implementation is selected.

In one embodiment, the routing information, the configuration and/or the instantiation uses information contained in the network function specification data structure. For example, the network function specification data structure may contain information how the selected network function implementation should be configured.

As mentioned previously, one particular embodiment of the present disclosure relates to a network function specification data structure, wherein:
(i) the first network function implementation is a physical network function implementation of the network function; and
(ii) the second network function implementation is a virtual network function implementation of the network function.

Although the development of network function virtualization has eased deployment and management (scalability) of network services, the applicant has recognized that physical network functions have several advantages as well. Such advantages include enhanced performance and current presence in the network. Hence, the present disclosure provides for a method and control system enabling hybrid deployment of physical and virtual network functions when providing a network service. In one embodiment, the method and control system enable provisioning of a service by allocating network resources for the service.

The network function specification data structure is a generic data structure defining an individual network function of a service containing both at least one physical network function implementation and a virtual network function implementation of the network function. If for a particular network function, both a physical implementation and a virtual implementation exist or can be instantiated, the data structure allows performing the single network function in the network, either as a physical network function, a virtual network function or a combination of both.

In one embodiment, the network function specification data structure comprises a hardware identifier associated with the physical network function and a virtual machine identifier associated with the virtual network function. The unique hardware identifier and unambiguous virtual machine identifier enable determining the location of the physical machine performing the physical network function and the location of the virtual machine image performing the virtual network function. Eventually, a physical location (one or more network addresses) of the physical machine performing the physical network function is needed. Use of a unique hardware identifier allows the network function specification data structure to remain generic. In one embodiment, the network address may be resolved using the hardware identifier from the network function specification data structure to identify at least one network address of a device configured for performing the physical network function. The control system may employ a repository of network addresses that can be mapped to a particular unique hardware identifier.

When using a hybrid network function control system wherein physical network function implementations and virtual network function implementations may be used alternatively or in combination, the representation of the resources used by the physical machine and the virtual machine (VM) in performing the respective functions may differ.

For physical network functions, it is common that service resources are defined, whereas resources for virtual machines are commonly expressed in terms of CPU time, memory, disk space, etc. Hence, in one embodiment, a mapping may be enabled between resource representations for performing the physical network function and resource representations for performing the virtual network function. In this manner, the amount of resources for the virtual machine may be determined for a given request of service resources. The service resources available for the physical network function are normally known at the control system. The mapping may be performed in the control system by retrieving the mapping information from a service resource mapping system. In one embodiment, initial information on the mapping between the resource representation for performing the physical network function and the resource representation for performing the virtual network function is obtained from the network function specification data structure. In this manner, the control system is informed on the initial mapping between service resources and virtual machine resources. Alternatively, the mapping information may be acquired at run time. In one embodiment, resource usage for performing the virtual network functions in the network may be monitored for updating the mapping information.

Network services may require multiple functions to be performed in a specific order. Such a network service may be defined as a service function chain. In one embodiment, the service function chain comprises a reference to the network function specification data structure. When the service function chain contains multiple network functions, each network function may be referred to by a reference to a network function specification data structure comprising at least one physical network function implementation and at least one virtual network implementation.

As will be appreciated by one skilled in the art, one or more steps of the present disclosure may be embodied as a system, a method or a computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present disclosure may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java(TM), Smalltalk, C++ or the like and conventional procedural programming languages, such as the "C" programming language or similar pro-programming languages. The program code may execute entirely on the users computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Embodiments of the present invention will be further illustrated with reference to the attached drawings, which schematically will show embodiments according to the invention. It will be understood that the present invention is not in any way restricted to these specific embodiments.

It is noted that the invention relates to all possible combinations of features recited in the claims.

BRIEF DESCRIPTION OF THE DRAWINGS

Aspects of the invention will be explained in greater detail by reference to exemplary embodiments shown in the drawings, in which:

FIGS. 3A and 3B are examples of a service function chain and a network function implementation data structure according to an embodiment of the invention;

DETAILED DESCRIPTION OF THE DRAWINGS

Figure 2:
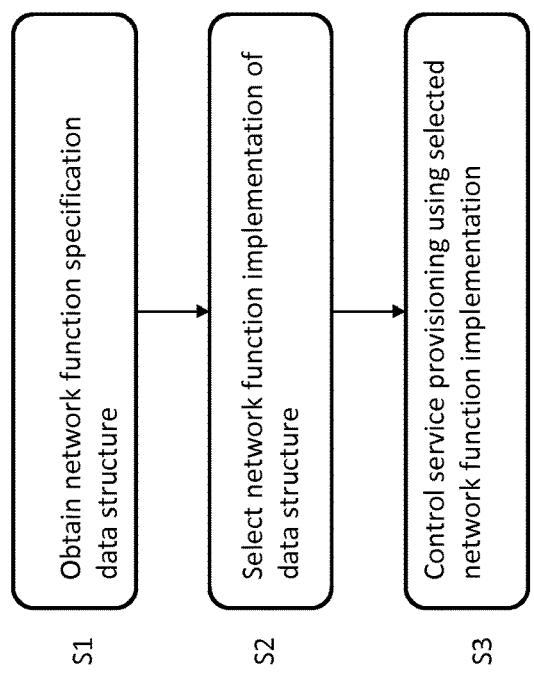
FIG. 2 is a flow chart illustrating steps of a method for controlling service provisioning in a network according to an embodiment of the invention.
Figure 1:
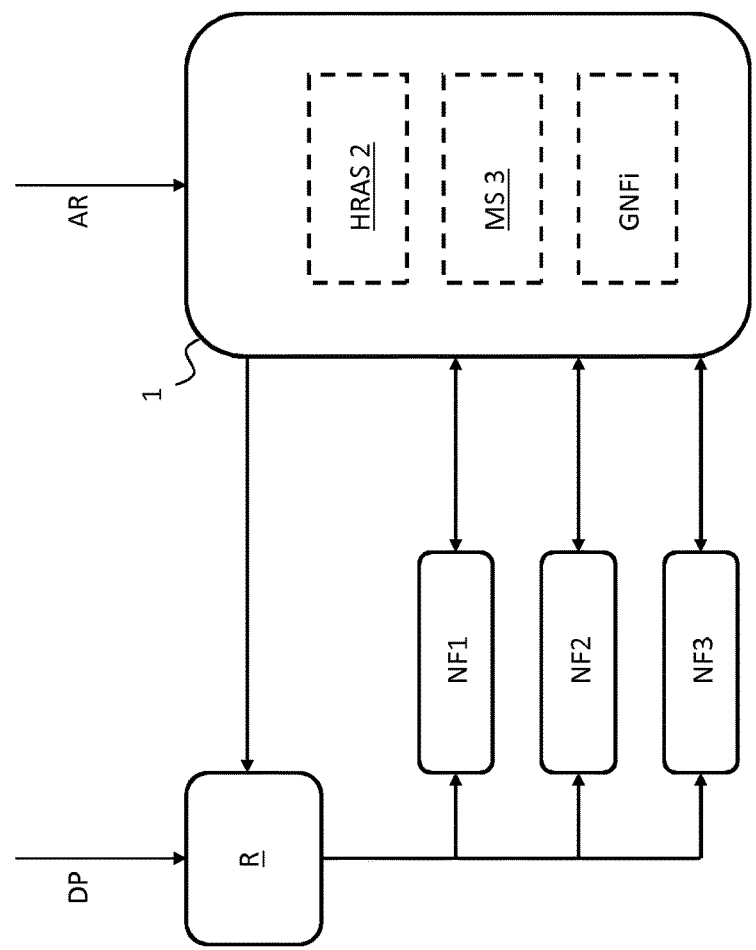
FIG. 1 shows a schematic illustration of a control system for controlling service provisioning in a network according to an embodiment of the invention.

FIG. 1 is a schematical illustration of a control system 1 for provisioning a service in a network. FIG. 2 is a flow chart illustrating some steps of the operation of the control system 1.

Control system 1 is configured to control a routing system R and to control configuration and/or instantiations of implementations of network functions NF1, NF2, NF3 in the network. If the control actions have been conducted, data packets DP are routed by routing system R to the implementations of the network functions NF1, NF2, NF3 to enjoy the network service. Control system 1 may receive monitoring information back from the network.

Control system 1 may further comprise at least one of a Hybrid Resource Allocation System HRAS 2 and a Mapping System MS 3. These systems are particularly advantageous when physical and virtual network functions are to be allocated and will be described in further detail with reference to FIGS. 4 and 5, respectively.

Prior to routing the data packets DP to the implementations of the network function NF1, NF2, NF3, the service needs to be provisioned in the network. Such service provisioning includes allocating network resources to service.

Service provisioning is initiated by an allocation request AR for providing a service arriving at the control system 1. The allocation request may contain a service function chain SFC defining one or more network functions NF and the order of the network functions NF through which the data packets DP should be routed to enjoy the service. Further information, such as configuration information, resource demands and requirements on the network links between the network functions NF, may be contained in the allocation request.

In order to provision the service, a generic network function specification data structure GNFi is obtained at the control system 1 for at least one of the network functions NFi. This is shown in step S1 of FIG. 2. The generic network function specification data structure GNFi may e.g. be predefined and stored by the service provider in control system 1.

The network function specification data structure GNFi is associated with at least a first implementation and a second implementation of the network function NFi. Implementations of a network function NFi provide the same network function but differ from each other in one or more characteristics. One characteristic pertains to different configurations of the network function NFi. Another difference relates to the performance of the implementations. Still another characteristic, that will be described below in more details, relates to the distinction between a physical implementation of the network function, commonly abbreviated as PNF, and a virtual implementation of a network function, commonly abbreviated as VNF.

The control system 1 is configured for selecting the first network function implementation or the second network function implementation of the network function in the network function specification data structure GNFi. This is shown as step S2 in FIG. 2.

The network function specification data structure GNFi is a generic data structure defining an individual network function of a service defining different implementations of the network function from which a selection can be made, flexibility in controlling network service provisioning is obtained. One example of controlling service provisioning is controlling the allocation of resources to the network service using the selected implementation of the network function as shown in step S3.

FIG. 3A depicts an example of a service function chain SFC.

The upper part of FIG. 3A provides an example of a prior art service function chain SFC. The SFC comprises network functions NF1, NF2 and NF3. Each network function refers to a definition of the network function as disclosed in ETSI Draft Specification GS-NFV-MAN V0.6.1, "Network Function Virtualization (NFV): Management and Orchestration" (2014-July). In particular, network function NF1 refers to a physical network function definition PNFD1, network function NF2 refers to virtual network function definition VNFD1 and network function NF3 refers to virtual network function definition VNFD2.

The lower part of FIG. 3A provides an example of the present disclosure wherein an additional layer is provided for selecting one of several implementations of a network function NF. To that end, the service function chain comprises or refers to the generic network function specification data structure GNFi. In particular, GNF1 refers to physical network function definition PNFD1 and physical network function definition PNFD2, GNF2 refers to physical network function definition PNFD3 and virtual network function definition VNFD1, and GNF3 refers to virtual network function definition VNFD2 and virtual network function definition VNFD3.

It should be appreciated that it is not required that all generic network function specification data structures GNFi in the SFC contain two implementations of a network function NFi. It may be that a generic network function specification data structure contains more or less than two implementations of a network function NFi.

Several ways have been envisaged for the SFC to comprise the generic network function specification data structure. One way is for the SFC to refer to the generic network function specification data structure. The SFC may e.g. contain identifiers linking the chosen network functions NF to a generic NF descriptor. Another way is for the SFC to include the implementations of the network function. However, other Service Function Chain Specifications may be used.

From FIG. 3A, it can be observed that the SFC comprising the generic network function specification data structure GNFi enables more flexibility for service provisioning. The allocation request AR may contain the SFC comprising the generic network function specification data structure GNFi and the control system 1 may select one out of several implementations for provisioning the service for each of the network functions NF. The control system 1 may select implementations PNFD1, VNFD1 and VNFD2 for performing the network service such that the service would comprise the same network function definitions as would be the case when the SFC of the upper part of FIG. 3A would have been processed. However, unlike the SFC of the upper part of FIG. 3A, the control system 1 is enabled to select other implementations for network functions NF1, NF2 and NF3, e.g. PNFD2, PNFD3 and VNFD3.

The particular implementation of the network function NFi can be selected on the basis of a particular condition set for the selection. The particular condition may involve the status of certain information. Multiple conditions may be applicable.

The information may relate to network state information monitored by the control system 1. For example, control system 1 may have determined that the load of the physical device executing implementation PNFD1 is high and therefore selected PNFD2 running on a different device to handle the new service request AR.

The information may also relate to policy information. Policies may be either defined by the service provider or by the customer sending the service allocation request AR. For example, the service provider may have set that for NF2, the function is preferably executed on a physical device. Hence, network function NF2 is therefore executed by the implementation defined by PNFD3 and not by VNFD1. Another example involves a policy set by the customer that network function NF2 should not be run in an external data centre and hence, PNFD3 is selected.

The information may also relate to resource utilization. For example, virtual network function implementations may be over-utilized or underutilized. If VNFD2 is over-utilized, the network function specification data structure enables selection of VNFD3.

Other information that may be used for selecting a particular implementation of a network function includes service level requirement information, quality of service requirement information, configuration requirement information, etc. For example, from the configuration requirements it may be determined that this function can only be executed on a machine dedicated to this function, i.e. a physical network function. If this requirement would hold for NF2, PNFD3 is selected instead of VNFD1.

FIG. 3B depicts an example of a generic network function specification data structure GNFi.

The network function specification data structure has a hierarchical structure. Generic properties of the network function may be defined in a root, e.g. relating to the resource type it provides and the interface it provides.

Every resource definition may contain both a name and the resource type (e.g. integer, double). The resource types defined here are offered by each network function implementation.

To use a network function NF in an SFC, a configuration of the network function is desired. Therefore, a configuration interface is provided. This interface defines all operations that are provided to configure the network function. The implementation of the interface depends on how the network function is implemented. For example, a hardware firewall may be configured differently from a virtual function firewall, but may provide the same configuration interface such that configuration may be conducted from the same component. While all network function implementations implement the same configuration interface, a formal interface specification only adds type-safety to the specification. Therefore an explicit definition of the interface can potentially be omitted.

The network function specification data structure comprises a first branch defined for the first network function implementation (in this example, a virtual network function implementation) and a second branch defined for a second network function implementation (in this case, a physical network function implementation). Properties relating specifically to the first network function implementation and the second network function implementation may be defined in the respective branches. If the first and second network function implementations relate to two physical network functions or to two virtual network functions having distinct properties, the control system may determine the appropriate network function implementation on the basis of the difference in properties and the requirements from the service request (as e.g. contained in the service function chain).

The network function specification data structure GNFi comprises a hardware identifier associated with the physical network function implementation and a virtual machine identifier associated with the virtual network function implementation. The unique hardware identifier and unambiguous virtual machine identifier enable determining the location of the physical machine performing the physical network function and the location of the virtual machine image performing the virtual network function. Eventually, a physical location (one or more network addresses) of the physical machine performing the physical network function is needed. Use of a unique hardware identifier allows the network function specification data structure GNFi to remain generic. The network address of the physical machine may be resolved using the hardware identifier from the network function specification data structure GNFi to identify at least one network address of a device configured for performing the physical network function. The control system 1 may employ a repository of network addresses that can be mapped to a particular unique hardware identifier.

In FIG. 3B, the virtual network function implementation is defined by using attribute 'type="VM"' in a "Function Implementation" element. Two elements are defined. The "Image" contains an unambiguous reference (e.g. using a Uniform Resource identifier (URI)) to a VM image. The VM image itself can be defined using an Open Virtualization Format (OVF) package. The other element is the configuration interface implementation. The interface implementation defines an unambiguous reference to a code artifact that implements the network function configuration interface. This implementation is then used to communicate between the network function implementation and the control system 1.

The physical network function implementation is defined using attribute type 'type="hardware"' in a "FunctionImplementation" element. To be able to link the network function implementation to physical hardware, the network address that is associated with the hardware is accessible from the specification. To ensure that the network function specification data structure remains generic and does not contain the physical location of hardware within the network, a centralized hardware URI repository may be used that is capable of mapping unique hardware references to a collection of hardware URIs. Using this approach, a reference to the hardware id can be added in the network function specification data structure, which can then be resolved to a collection of network addresses. Like for the virtual network function implementation, an interface implementation is also defined for the physical network function implementation.

The control system 1 will now be further described with reference to FIGS. 4 and 5 when physical and virtual implementations of a network function NFi can be allocated.

The control system 1 manages a collection of network functions NFi. Both physical network function implementations that are provided by physical devices and virtual network function implementations, that are implemented as computational services provided by VMs, are supported.

A central component of the control system 1 is a Hybrid Resource Allocation System (HRAS) 2. HRAS 2 is a logically centralized management plane component that receives incoming allocation requests AR. HRAS 2 is responsible for determining how (i.e., using physical or virtual NF implementation) and where (i.e., which physical device, which VM) NFs are to be allocated. Once the allocation is determined, the HRAS 2 configures the routes in the routing system R (see FIG. 1) and configures any physical network function implementations and instantiates virtual network function implementations. As the HRAS 2 receives allocation requests AR and allocates them, the HRAS 2 is aware of all deployed SFCs.

Mapping System MS 3 is responsible for determining and maintaining a mapping between service resources and VM resources. Service resources are commonly understood to be the resources that are associated with a network function NFi, e.g. number of requests per second. VM resources are the resources that are associated with a VM, e.g. CPU, memory and disk space. Mapping system 3 is responsible for determining how many VM resources are needed to provide a virtual network function that offers a desired amount of service resources. Using the mappings determined by the MS 3, HRAS 2 is enabled to accurately determine the VM resource requirements of various network function configurations while determining resource allocations for an SFC. To accurately estimate and fine-tune these mappings a feedback mechanism is used that monitors the virtual network function implementations. An initial mapping can be provided in the generic network function specification data structure GNFi that MS 3 may obtain from HRAS 2.

Figure 4:
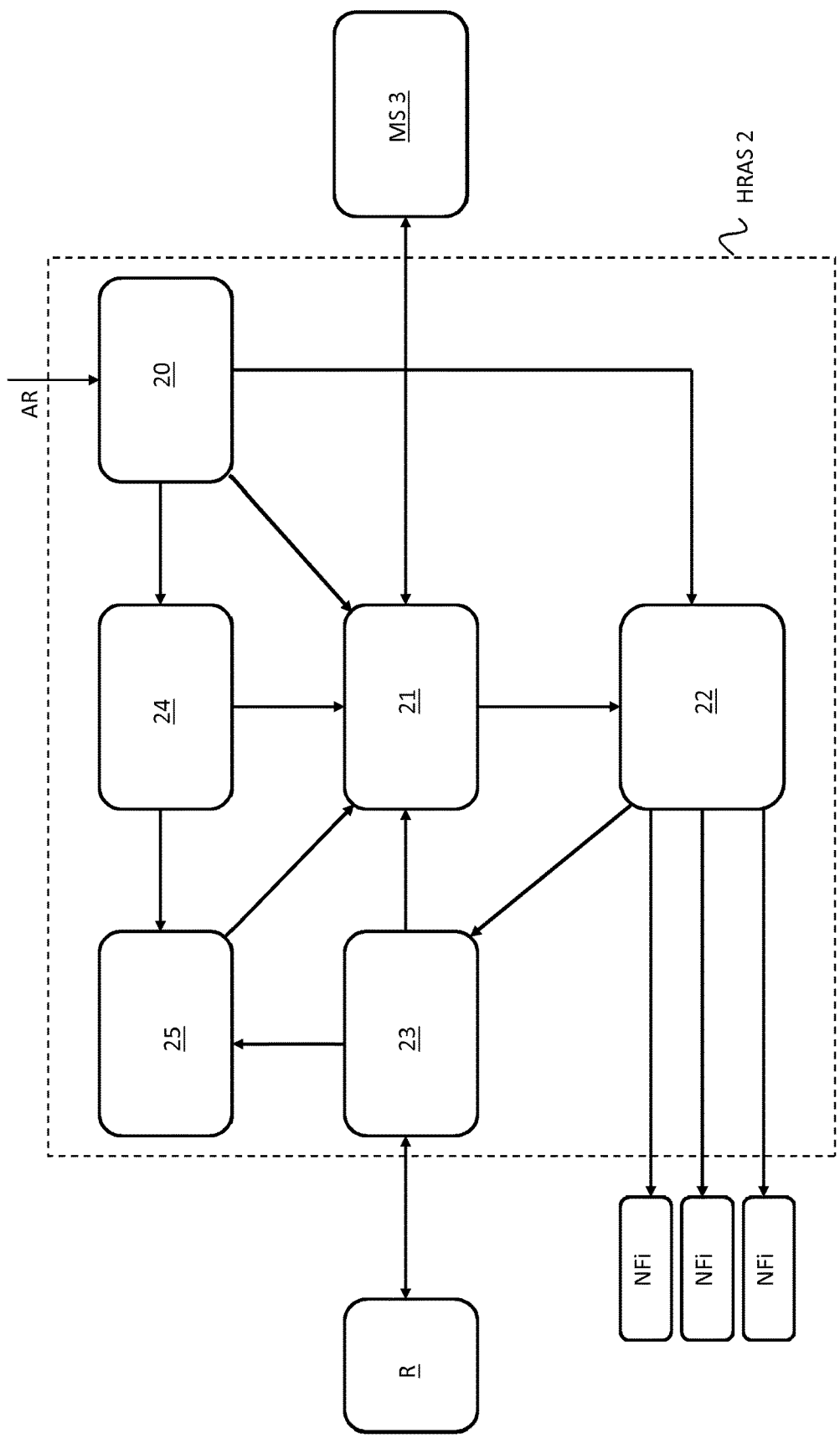
FIG. 4 is a schematic illustration of various components of a control system as shown in FIG. 1.

As is shown in FIG. 4, HRAS 2 comprises several interacting components. The components include at least a request manager 20, a service chain allocation component 21, a service chain configuration component 22 and a routing controller 23. Additionally, HRAS 2 may contain a service policy configuration manager 24 and a monitoring component 25.

Request manager 20 receives incoming SFC allocation requests AR and is responsible for accepting, storing and managing information regarding the service function chain specifications SFC and network function specification data structure GNFi. This information is used by various components within the HRAS 2.

Service chain allocation component 21 manages SFC allocation by determining where and how the associated network functions are allocated. To achieve this, the service chain allocation component 21 aggregates management information from one or more of the components in the HRAS 2, such as network state information from the routing controller 23, policy information from the service policy configuration manager 24 and SFC allocation requests from the request manager 20. Afterwards, the service chain allocation component 21 executes a service chain allocation algorithm, determining where and how the various network functions are instantiated. The selection may be made on the basis of the status of certain information, as described above and the generic network function specification data structure GNFi. Finally, the configuration changes are sent to the service chain configuration component 22, which is responsible for enacting the computed changes.

The service chain allocation component 21 may take various management policies into account during the allocation process and can decide to allocate network function in different implementations, e.g. allocating a network function on a physical device, allocating another network function of an SFC as a virtual network function on a virtual machine and load balancing between multiple physical and virtual instances.

Service chain configuration component 22 is used to apply the configuration computed by the service chain allocation component 21. This component is responsible for both registering the SFC network routes, and for configuring the selected network function implementations. To register the network routes, the configuration component 22 communicates with the routing controller 23. The service chain configuration component 22 also instantiates and configures the virtual network function implementations and configures the physical network function implementations executing the network functions NFi. To determine how the network functions NFi are configured, the SFC Specification and the network function specification data structure GNFi, both available in the control system 1, are used.

The routing controller 23 interacts with the routing system R to ensure that the data packets DP are routed to the correct network function implementation. Routing controller 23 may be configured to use Software Defined Networking (SDN) principles. Routing system R can be implemented using existing SDN technologies such as OpenFlow. If a route for incoming data packets DP is unknown, the routing controller 23 is queried for correct routing information. When this happens, routing controller 23 determines the correct route based on its computed allocation, and subsequently configures it in the routing system R. The routes used are computed and configured by different components within the HRAS 2, such as service chain allocation component 21 and service chain configuration component 22.

The service policy configuration manager 24 stores policies and Service Level Agreement (SLA) requirements that impact the SFC deployments. These policies may be specified in the SFC allocation requests AR that are received by the request manager 20 or be specified by the service provider operating HRAS 2. The service chain allocation component 21 may use this policy information during the execution of the SFC allocation algorithm, ensuring the quality requirements are taken into account when selecting a network function implementation. The service policy configuration manager may also contain policies that define how failure to achieve the policies should be addressed, e.g. by prioritizing more important flows. Possible policies include a prohibition of using specific locations to execute the virtual network functions (e.g. constraints prohibiting the processing from being done in a different country).

Monitoring component 25 monitors the network performance of deployed SFCs and ensures that policies are correctly implemented. The monitoring component notifies the service chain allocation component 21 when the performance of an SFC is lower than required by its SLA.

Figure 5:
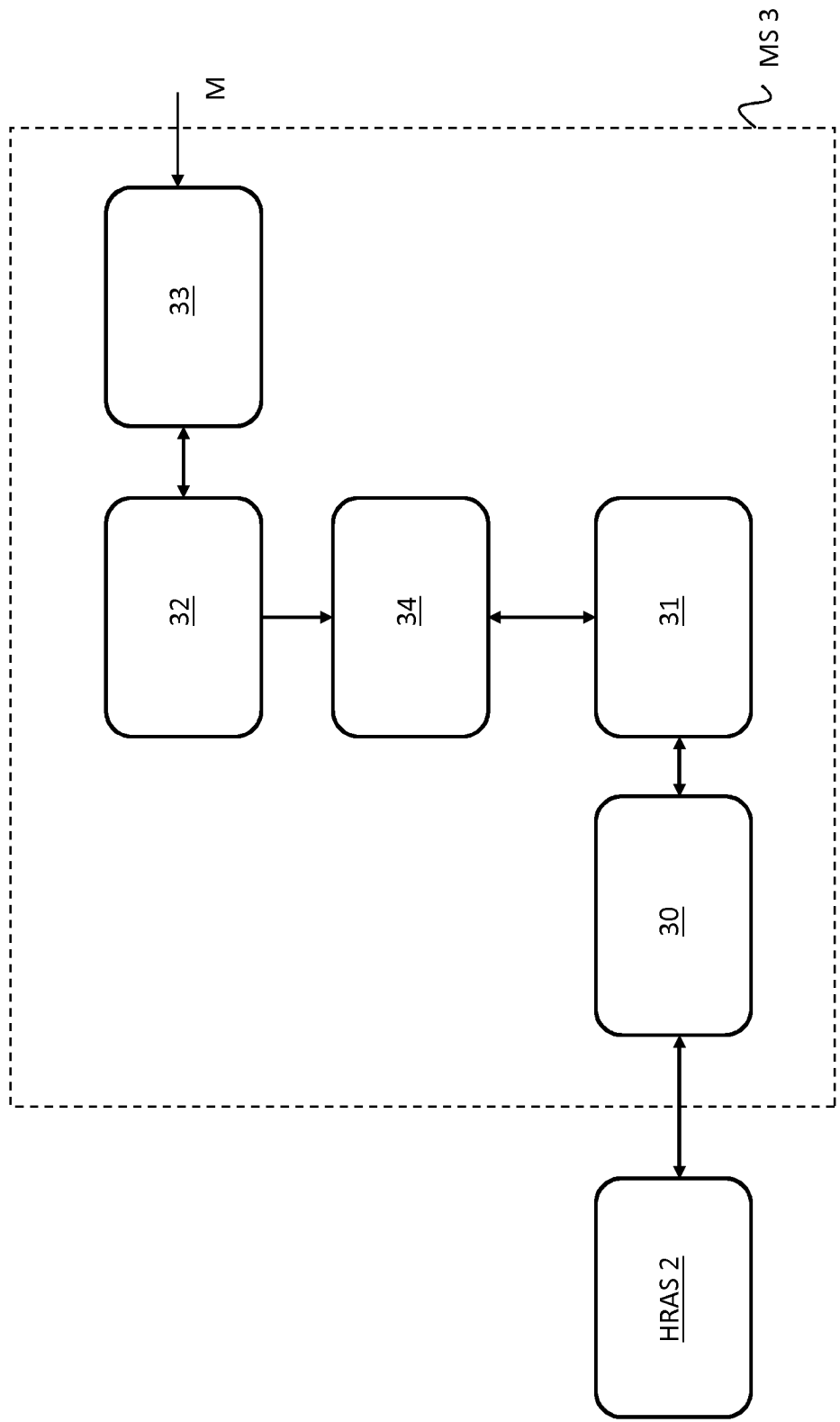
FIG. 5 is a schematic illustration of a mapping system of the control system of FIG. 1 according to an embodiment of the invention.

Turning now to FIG. 5, the components of service resource mapping system MS 3 are shown in further detail. Mapping system MS 3 is responsible for determining and maintaining a mapping between service resources (such as requests per second) and VM resources (such as CPU and Memory). The objective of this system is to determine the amount of VM resources that a virtual network function will utilize based on required service resources. Mapping system MS 3 may be involved in two processes, viz. a retrieval process and a monitoring process. The retrieval process is used to retrieve service resource mappings by the HRAS 2 from the mapping system MS 3. This process may e.g. be invoked when the service chain allocation component 21 of HRAS 2 needs to determine VM resource information. The monitoring process comprises a, preferably continuously active, monitoring loop configured to update the resource mappings based on the performance of deployed network functions NFi.

To support these processes, mapping system MS 3 comprises a resource type mapping interface 30, a service resource mapping repository 31, a resource use monitor 32 receiving monitoring information M, a VM resource performance application programming interface API 33 and a resource mapping updater 34.

When resource mappings are needed by HRAS 2, MS 3 is queried using resource type mapping interface 30 that retrieves mappings based on information stored within the mapping system MS 3. HRAS 2 comprises a complementary interface.

The resource mappings are stored in a service resource mapping repository 31. This repository contains a database containing the resource mappings. When network functions are added an initial mapping may be defined in the generic network function specification GNFi. Alternatively, the monitoring process may be enabled to learn the mappings while network functions are running.

Resource use monitor 32 monitors the resource use of the virtual network functions. To achieve this, the resource use monitor receives information from the various virtual network function implementations in order to determine the current VM resource use and the corresponding service resource use. To generalize this information retrieval for all virtual network function implementations, a VM Resource Performance API 33 may be specified that is implemented for all virtual network function implementations.

VM Resource Performance API 33 is an interface that may be provided by all virtual network function implementations to expose the current service resource load and VM resource load. This API can be provided in various ways. For example, the API 33 may be implemented by every individual virtual network function implementation. As another example, the API 33 may be implemented in a separately deployed component that itself monitors a family of virtual network function implementations.

Resource mapping updater 34 is responsible for updating, e.g. refining, the resource mappings stored in the service resource mapping repository 31. By comparing the current mappings with the measured values that are observed by the resource use monitor 32, updated mappings can be determined and provided to HRAS 2. To do this, standard learning algorithms may be used. The resulting updated values are then stored in the service resource mapping repository 31 and may be made available to the HRAS 2 in the retrieval process.

Figure 6:
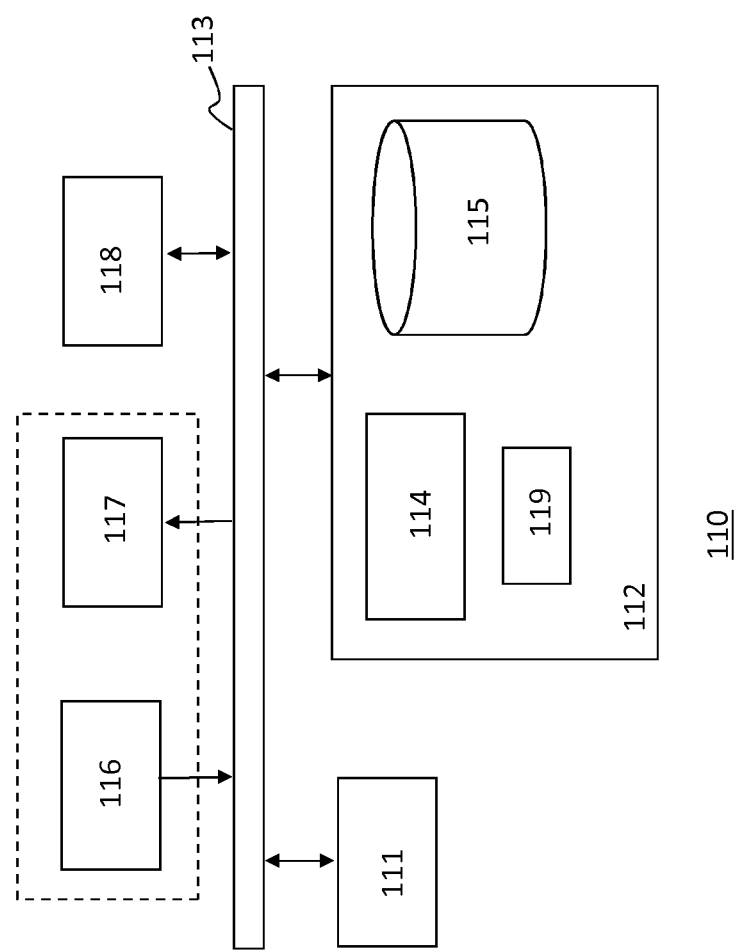
FIG. 6 is a schematic block diagram of a general system, such as the control system of FIG. 1.

FIG. 6 is a schematic block diagram of a general system, such as the control system 1.

As shown in FIG. 6, the data processing system 110 may include at least one processor 111 coupled to memory elements 112 through a system bus 113. As such, the data processing system may store program code within memory elements 112. Further, the processor 111 may execute the program code accessed from the memory elements 112 via a system bus 113. In one aspect, the data processing system may be implemented as a computer that is suitable for storing and/or executing program code. It should be appreciated, however, that the data processing system 110 may be implemented in the form of any system including a processor and a memory that is capable of performing the functions described within this specification.

The memory elements 112 may include one or more physical memory devices such as, for example, local memory 114 and one or more bulk storage devices 115. The local memory may refer to random access memory or other non-persistent memory device(s) generally used during actual execution of the program code. A bulk storage device may be implemented as a hard drive or other persistent data storage device. The processing system 110 may also include one or more cache memories (not shown) that provide temporary storage of at least some program code in order to reduce the number of times program code must be retrieved from the bulk storage device 115 during execution.

Input/output (I/O) devices depicted as an input device 116 and an output device 117 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 6 with a dashed line surrounding the input device 116 and the output device 117). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 118 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 110, and a data transmitter for transmitting data from the data processing system 110 to said systems, devices and/or networks. Modems, cable modems, and Ethernet cards are examples of different types of network adapter that may be used with the data processing system 110.

As pictured in FIG. 6, the memory elements 112 may store an application 119. In various embodiments, the application 119 may be stored in the local memory 114, the one or more bulk storage devices 115, or apart from the local memory and the bulk storage devices. It should be appreciated that the data processing system 110 may further execute an operating system (not shown in FIG. 6) that can facilitate execution of the application 119. The application 119, being implemented in the form of executable program code, can be executed by the data processing system 110, e.g., by the processor 111. Responsive to executing the application, the data processing system 110 may be configured to perform one or more operations or method steps described herein.

In one aspect of the present invention, the data processing system 110 may represent HRAS 2 or MS 3, or a component thereof, as disclosed herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 111 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A computer-implemented method in a control system for controlling provisioning of a service in a network, the service comprising one or more network functions including a first network function, the method comprising:
   receiving an allocation request for providing the service;
   obtaining a predefined stored network function specification data structure identifying and specifying the first network function and defining at least a virtual implementation associated with a virtual machine identifier, for performing the first network function and a physical implementation, associated with a hardware identifier, for performing the first network function; and
   after receiving the allocation request, controlling provisioning of the service in the network by the control system making a selection of one of the defined implementations in the predefined stored network function specification data structure, for performing the first network function.

2. The method according to claim 1, wherein making the selection of the one of the defined implementations in the predefined stored network function specification data structure for performing the first network function is dependent on information available to the control system, wherein the information available to the control system is at least one of:
   network state information;
   policy information;

service level requirement information;
quality of service requirement information; or
configuration requirement information for the network function.

3. The method according to claim 1, wherein the service is defined as a service function chain comprising at least the first network function, wherein the service function chain comprises a reference to the predefined stored network function specification data structure.

4. The method according to claim 1, wherein controlling the provisioning of the service comprises:
providing routing information for data packets to be processed by the first network function, wherein the routing information is dependent on the selection of the one of the defined implementations in the predefined stored network function specification data structure for performing the first network function,
and wherein the routing information uses information contained in the predefined stored network function specification data structure.

5. The method according to claim 1, wherein the predefined stored network function specification data structure comprises the hardware identifier associated with the physical implementation and the virtual machine identifier associated with the virtual implementation, and wherein the hardware identifier from the predefined stored network function specification data structure is used to identify at least one network address of a device configured for performing the physical implementation.

6. The method according to claim 1, further comprising enabling mapping between resource representations for performing the physical implementation and resource representations for performing the virtual implementation.

7. The method according to claim 6, further comprising:
obtaining initial information on the mapping between the resource representation for performing the physical implementation and the resource representation for performing the virtual implementation from the predefined stored network function specification data structure.

8. The method according to claim 6, further comprising:
monitoring resource usage for performing virtual network functions in the network for updating mapping information.

9. The method according to claim 1, wherein controlling the provisioning of the service comprises:
configuring or instantiating at least one of the virtual implementation or the physical implementation when the virtual implementation or the physical implementation is selected.

10. The method according to claim 9, wherein
configuring or instantiating uses information contained in the predefined stored network function specification data structure.

11. A non-transitory computer-readable medium having instructions stored thereon that, when executed by one or more processors of a system, cause the system to carry out operations including:
receiving an allocation request for providing the service;
obtaining a predefined stored network function specification data structure (i) identifying a first network function of the service comprising one or more network functions including the first network function, and (ii) specifying the first network function and defining at least a virtual implementation, associated with a virtual machine identifier, for performing the first network function and a physical implementation, associated with a hardware identifier, for performing the first network function; and
after receiving the allocation request, controlling provisioning of the service in the network by making a selection of one of the defined implementations in the predefined stored network function specification data structure, for performing the first network function.

12. The non-transitory computer-readable medium of claim 11, wherein the operations further include configuring or instantiating the selected implementation.

13. A control system configured for controlling provisioning of a service in a network, the service comprising one or more network functions including a first network function, wherein the control system comprises:
one or more processors; and
memory storing instructions that, when executed by the one or more processors, cause the control system to carry out operations including:
receiving an allocation request for providing the service;
obtaining a predefined stored network function specification data structure identifying and specifying the first network function and defining at least a virtual implementation associated with a virtual machine identifier, for performing the first network function and a physical implementation, associated with a hardware identifier, for performing the first network function; and
after receiving the allocation request, controlling provisioning of the service in the network by making a selection of one of the defined implementations in the predefined stored network function specification data structure, for performing the first network function.

14. The control system of claim 13, wherein the operations further include configuring or instantiating the selected implementation.

15. The control system of claim 13, wherein the predefined stored network function specification data structure further comprises at least one property of the first network function applying to both the virtual implementation and the physical implementation.

16. The control system of claim 13, wherein the predefined stored network function specification data structure comprises the hardware identifier associated with the physical implementation and the virtual machine identifier associated with the virtual implementation.

17. The control system of claim 13, wherein making the selection of the one of the defined implementations in the predefined stored network function specification data structure for performing the first network function identified in the network function specification data structure is dependent on information available to the control system, wherein the information available to the control system is at least one of:
network state information;
policy information;
service level requirement information;
quality of service requirement information; or
configuration requirement information for the network function.

* * * * *